Figure 7:
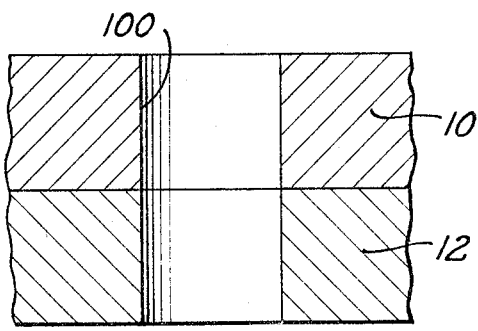

Sept. 6, 1966    L. SALTER ETAL    3,270,410
METHOD OF PRESTRESSED FASTENING OF MATERIALS
Filed May 20, 1963    3 Sheets-Sheet 1
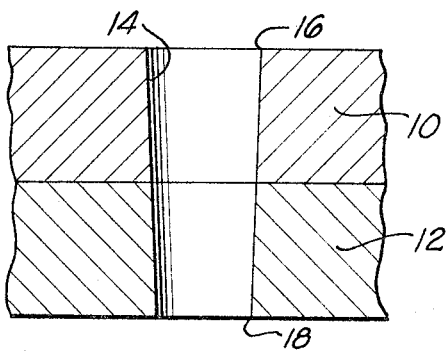
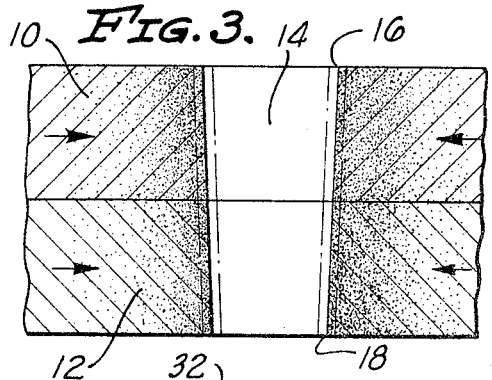
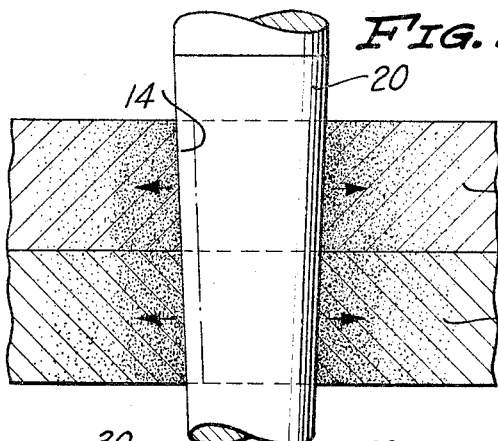
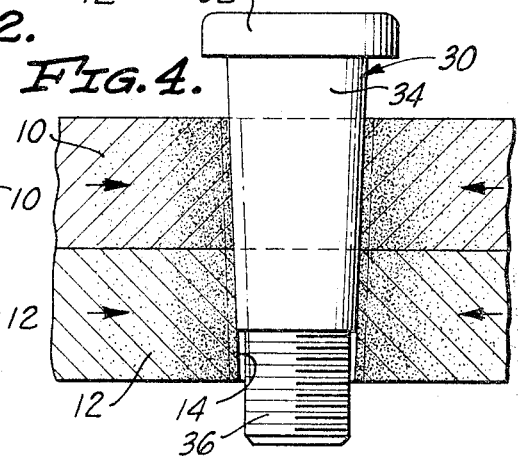
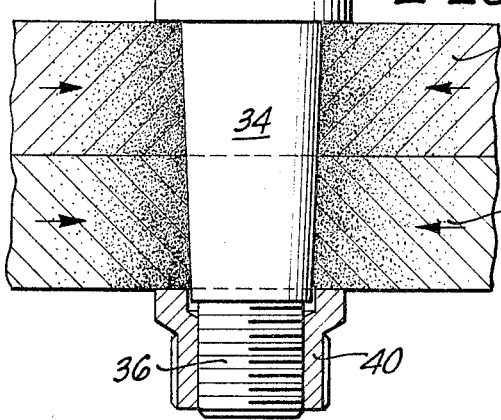
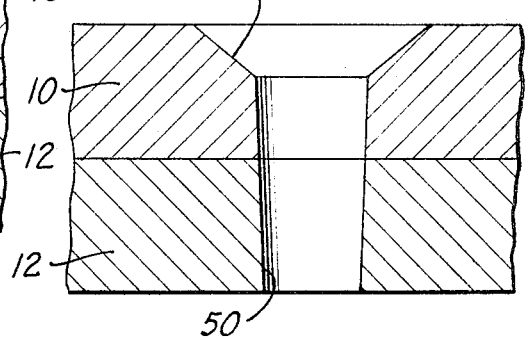
INVENTORS
LARRY SALTER,
FRANKLIN S. BRILES
BY MAHONEY, HALBERT &
HORNBAKER
ATTORNEYS Sept. 6, 1966    L. SALTER ETAL    3,270,410
METHOD OF PRESTRESSED FASTENING OF MATERIALS
Filed May 20, 1963    3 Sheets-Sheet 2

INVENTORS
LARRY SALTER,
FRANKLIN S. BRILES
BY MAHONEY, HALBERT &
HORNBAKER
ATTORNEYS

Sept. 6, 1966   L. SALTER ETAL   3,270,410
METHOD OF PRESTRESSED FASTENING OF MATERIALS
Filed May 20, 1963   3 Sheets-Sheet 3

INVENTORS
LARRY SALTER,
FRANKLIN S. BRILES
BY MAHONEY, HALBERT &
HORNBAKER
ATTORNEYS

United States Patent Office 3,270,410
Patented Sept. 6, 1966

3,270,410
METHOD OF PRESTRESSED FASTENING
OF MATERIALS
Larry Salter, Palos Verdes Estates, and Franklin S. Briles, Rolling Hills, Calif., assignors to Briles Manufacturing, El Segundo, Calif., a co-partnership
Filed May 20, 1963, Ser. No. 281,550
3 Claims. (Cl. 29—446)

This invention relates to a method of increasing the fatigue strength of materials in the area of bores therethrough whereby predetermined amounts of favorably oriented compressive stresses are introduced not only in the surface areas of the material adjacent the bores, but also throughout the entire depth of the bores. The method may be applied to a variety of materials, but is especially adaptable for application to metal sheets, plates, forgings and castings, by way of example, and not by way of limitation, and particularly to sheets and plates used in aircraft construction, in which the fatigue factor is of paramount importance.

Fatigue factors have been attacked by applying tensile prestress in the area of a bore through the material, with reasonably satisfactory results. However, it is an object of the present invention to accomplish compressive stress, rather than mere tensile prestress.

It is, of course, well known that materials such as relatively thin metal sheets and plates, when under compression, are highly resistant to stress, corrosion, cracking, and fatigue damage. Many methods for protection against surface fatigue damage have been proposed and utilized by providing surface compression where transmitted surface cantilever type tensile stresses may be present or may be transferred under operational loads to adjacent surface stress critical areas. However, it is a further object of the present invention to provide a method of introducing subsurface compressive stresses as well so that such forces are present not only at the surfaces of the material, but also substantially uniformly throughout the entire thickness of the material.

It is a further object of the invention to provide a method of treating materials whereby harmful permanent set or localized yielding, normally predominant in the area of bores and fastenings in modern aircraft body construction, is significantly reduced, if not entirely eliminated, by applying compressive stresses throughout the entire depth of the bores.

By the utilization of a tapered bore, the application of the method of the present invention also provides a means of dimensional tolerance measurement, inherent in its usage, which is many times more accurate than that attainable with a straight, parallel-sided bore or hole.

It is preferred, that in applying the method of the present invention, the tapered pre-entry tool have an extremely slightly tapered body of, say, approximately 1/4" perfect, so that galling and broaching may be prevented, and so that a finished tolerance bore may be provided in one operation, without the necessity of further processing, but no limitation as to size is contemplated, and the size given is by way of illustration, and not by way of limitation.

With these and other objects in view, the invention consists of the construction, arrangement and combination of the various elements of the device whereby the objects contemplated are attained, as hereinafter set forth, pointed out in the appended claims, and illusrtated in the accompanying drawings.

Figure 8:
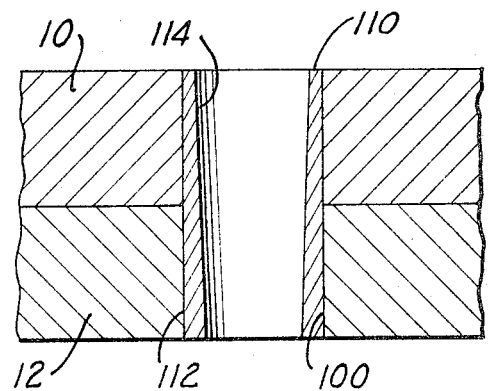
Figure 9:
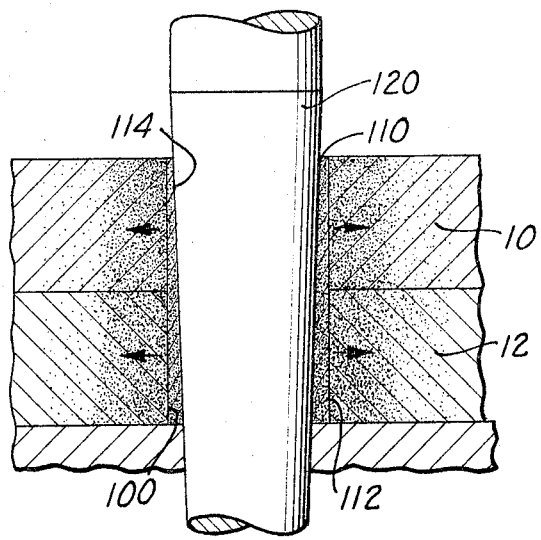
Figure 10:
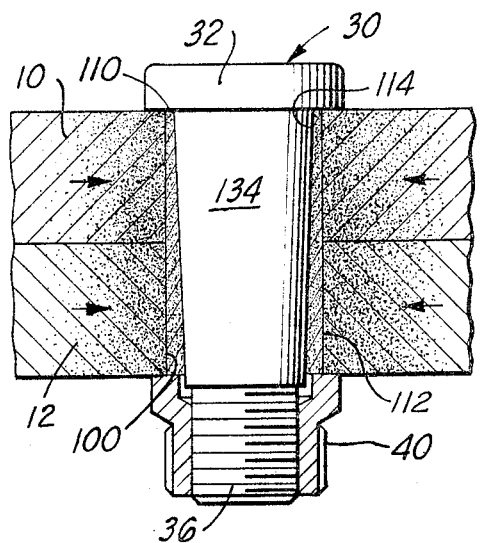
Figure 11:
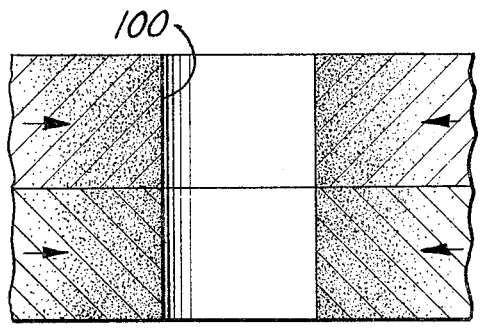
Figure 12:
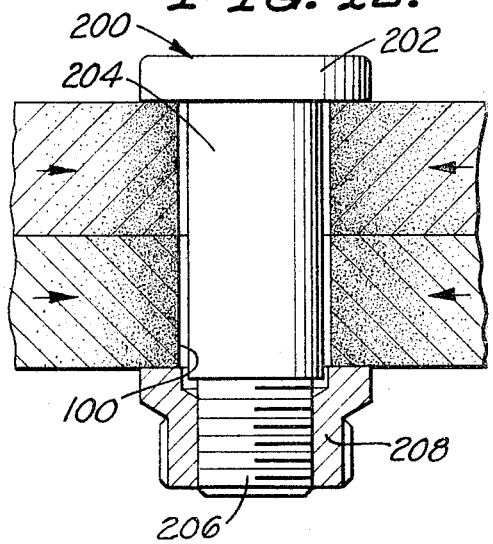
Figure 13:
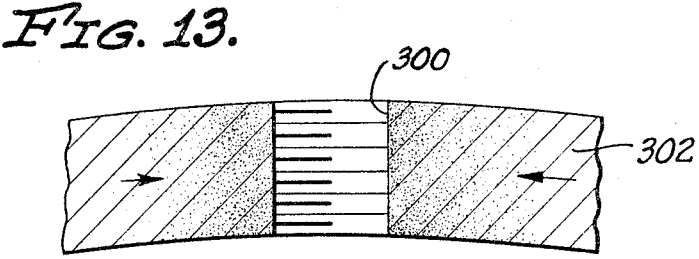
Figure 14:
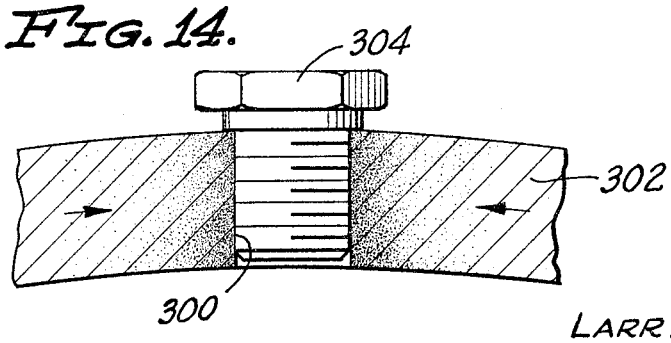

FIG. 1 is a vertical, sectional view of two sheets to be fastened and showing a tapered bore formed therethrough;
FIG. 2 is a view similar to FIG. 1, but showing a tapered pin inserted in the tapered bore of FIG. 1;
FIG. 3 is a view similar to FIG. 2, but showing the tapered pin removed from the tapered bore;
FIG. 4 is a view similar to FIG. 3, but showing a flat-headed tapered bolt partially inserted in the tapered bore of FIG. 3;
FIG. 5 is a view similar to FIG. 4, but showing the flat-headed tapered bolt with a nut mounted thereon and fully seated in the tapered bore of FIG. 4;
FIG. 6 is a fragmentary view similar to FIG. 1, but showing a countersink to receive the head portion of a flush-type tapered bolt;
FIG. 7 is a view similar to FIG. 1, but showing a straight bore formed through the sheets to be fastened;
FIG. 8 is a view similar to FIG. 7, but showing an internally tapered hollow sleeve inserted in the straight bore of FIG. 7 for application of an alterative method of prestressed fastening.
FIG. 9 is a view similar to FIG. 2, but showing the pin inserted in the tapered bore of the sleeve illustrated in FIG. 8;
FIG. 10 is a view similar to FIG. 5, but showing the bolt fully seated in the tapered bore of the sleeve after removal of the pin of FIG. 9;
FIG. 11 is a view similar to FIG. 10, but showing the sleeve of FIGS. 8, 9 and 10 fully removed from the straight bore;
FIG. 12 is a view similar to FIG. 11, but showing a straight-sided bolt inserted in the bore of FIG. 11, the side of said bolt being free of interference with the sides of the bore;
FIG. 13 is a view similar to FIG. 11, but showing an internally threaded straight bore through a curved structure; and
FIG. 14 is a view similar to FIG. 13, but showing a threaded plug inserted in the bore of FIG. 13.

Two overlying sheets or plates of material to be fastened are generally designated in the drawings as 10 and 12.

As illustrated in FIG. 1 of the drawings, a tapered bore 14 is formed through the sheets 10 and 12, one end 16 of the tapered bore 14 being, of course, of larger diameter than the other end 18 thereof, so that the bore 14 tapers evenly from end 16 to end 18.

Referring to FIG. 2 of the drawings, an evenly tapered tool or pin 20 is inserted in the bore 14. The degree of taper per inch of the pin 20 is substantially the same as the degree of taper per inch of the bore 14, so that, as the pin 20 is driven or pulled home into the bore 14, the material surrounding the bore 14 enters the parameter of strain lying beyond the elastic limit of the material, and between the elastic limit of the material and the ultimate tensile strength of the material, to provide a localized yielding throughout the entire thickness of the material in an area ranging radially outwardly from the bore 14.

The pin 20 is then removed from the bore 14, and the removal of the opposing force of the pin 20 in the bore 14 forces the periphery of the bore 14 and the material surrounding it into a stress gradient of peripheral compression radiating outwardly from the bore 14, such compression diminishing at some point substantially remote from the bore 14.

When the pin 20 has been removed from the bore 14, there being no longer an interference fit along the depth of the bore 14, some relatively small amount of the compression in the material of sheets 10 and 12 will be relieved, and the material will flow slightly so that the diameter of the bore 14, as illustrated in FIG. 3 of the drawings, will be somewhat less than it was when the pin 20 was in interference fit therein, as shown in FIG. 2, but somewhat greater than it was before the insertion of the pin 20, as shown in FIG. 1. However, because the interference fit of the pin 20 in the bore 14 has expanded the material of the sheets 10 and 12 beyond the elastic limit of the material, the material is forced to return to peripheral compression upon removal of the pin 20 since there is no longer any member to sustain tension, and thus the material is then highly resistant to fatigue and permanent set.

A tapered fastener, such as the bolt 30 of FIG. 4 of the drawings, is then inserted into the bore of FIG. 3.

Bolt 30 has a head 32, a tapered shank 34, and a threaded end 36. The shank 34 is evenly tapered, and the degree of taper per inch of the shank 34 is substantially the same as the degree of taper per inch of the bore 14 after removal of the pin 20, but the diameter of the shank 34 is greater than the diameter of the bore 14 in that condition, so that, as the bolt 30 is brought home to the seated position illustrated in FIG. 5 of the drawings, in the manner hereinafter described, the bore 14 is again expanded, but the normally high peripheral tensile stresses are no longer of substantial magnitude.

The threaded end 36 of the bolt 30 is straight-sided and of smaller diameter than any portion of the tapered shank 34, so that the threaded end 36 freely passes through the bore 14 without interference.

A nut 40 is threadably mounted on the threaded end 36 of the bolt 30. Application of torque to the nut 40 will pull the bolt 30 home to seated position, with the tapered shank 34 of the bolt 30 in interference fit with the bore 14, the interference fit being substantially identical throughout the entire depth of the bore 14.

The bore 50 of FIG. 6 of the drawings is identical with the bore 14, except that it has a countersink 52 for receiving a tapered bolt head.

The alternative method illustrated in FIGS. 7–10 of the drawings is utilized, for example, when a straight-sided bore, such as bore 100, has already been formed in sheets 10 and 12, but nevertheless it is desired to place the material of sheets 10 and 12 under compression. The only satisfactory method of obtaining substantially uniform compression throughout the depth of the material is to provide a tapered bore which receives a tapered object of the characteristics hereinabove described. A straight-sided pin of larger diameter driven into a straight-sided bore will gall and score, and uniform compression cannot thus be attained.

Consequently, in order to provide a tapered bore, a sleeve 110, having a straight-lined outer surface 112, and having an evenly tapered internal bore 114 is disposed in the bore 100, as illustrated in FIG. 8.

Following the process of the preferred form of the invention, an evenly tapered tool or pin 120, having all of the characteristics of the pin 20 of the preferred form of the invention, is driven into the tapered bore 114, until the sleeve 110 and the material of sheets 10 and 12 are expanded beyond the elastic limit of the material, but within the range of the ultimate tensile strength of the material. So as to retain sleeve 110 in bore 100 during the driving of the pin 120, a back-up member, suitably bored, or other satisfactory retention means, is provided.

The pin 120 is then removed and replaced by the bolt 30, which is drawn home by the application of torque to the nut 40, as hereinabove described.

The second alternative form of the invention illustrated in FIGS. 11 and 12 of the drawings shows the invention again applied to a straight-sided bore by the use of the sleeve 110 and the pin 120 illustrated in FIGS. 8 and 9 of the drawings, but the sleeve 110, as well as the pin 120, is removed from the bore 110 after the material of the sheets 10 and 12 have been expanded beyond the elastic limit of the material, but within the range of the ultimate tensile strength of the material, as hereinabove described.

A bolt 200, having a head 202 and a straight-sided shank 204, is then inserted in the bore 100. The outside diameter of the shank 204 may be less than the diameter of the bore 100, so that no interference fit results. The bolt 200 has a threaded end 206 on which a nut 208 is threadably engaged and torqued to pull the bolt 200 home to seated position.

A third alternative form of the invention is illustrated in FIGS. 13 and 14 of the drawings. This form of the invention is applied, for instance, to a single sheet or plate. FIGS. 13 and 14 show the invention utilized in a curved structure, such as a tank, where it is the object to prevent fatigue in the area surrounding a bore, which fatigue might otherwise occur from constant expansion and contraction of the tank, resulting in leakage around a plug inserted in the bore.

In this form of the invention, a straight-sided bore 300 is formed in the sheet or plate 302. The sleeve 110 is inserted in the bore 300, as shown in FIG. 8, and the tool or pin 120 is driven into the tapered bore 114 of the sleeve 110, as illustrated in FIG. 9. After the material of the sheet or plate 302 has been expanded beyond the elastic limit of the material, but within the ultimate tensile strength of the material, as hereinabove described, both the pin 120 and the sleeve 110 are removed from the bore 300, as in the second alternative form of the invention.

The bore 300 is threaded, and a threaded plug 304 is inserted therein and brought home.

The material of sheet or plate 302 being under compression, fatigue in the area of the material surrounding the bore 300 will be resisted, and leakage in the area about the plug will be prevented.

It will thus be seen that the method of the present invention may also be applied to entry bores which may fall in the paths of applied tensile expansion, but not subject to load-carrying ability, and where maintenance of bore diameter and elimination of fatigue in the area of the bore are to be attained.

While the instant invention has been shown and described herein in what are conceived to be the most practical and preferred embodiments thereof, it is recognized that departures may be made therefrom within the scope of the invention, which is therefore not to be limited to the details disclosed herein, but is to be accorded the full scope of the claims so as to embrace any and all equivalent methods, structures and devices.

We claim:

1. A method of prestressed fastening of layers of material which comprises the steps of: providing a tapered bore through the layers of material to be fastened; applying expansive force to the layers of material substantially uniformly and simultaneously throughout substantially the entire depth of the bore until the elastic limit of the material has been exceeded; relieving the expansive force; and providing an interference fit between a tapered fastening device and the tapered bore so as to prestress the layers of material under compression in the area surrounding the tapered bore.

2. A method of prestressed fastening of layers of material which comprises the steps of: providing a tapered bore through layers of material to be fastened; inserting in the bore a tapered tool having substantially the same degree of taper as the tapered bore but having a greater diameter than the tapered bore; driving the tapered tool in the tapered bore until the material has been expanded beyond its elastic limit; removing the tapered tool; inserting in the bore a tapered fastening device having substantially the same degree of taper as the tapered bore, but having a greater diameter than the tapered bore; and locking the fastening device in the bore so as to retain a prestressed interference fit between the tapered fastening device and the tapered bore.

3. A method of pre-reverse stressing of layers of material by expanding the wall of a bore so as to cause a material flow in the parameter of strain lying between the elastic limit of the material and its ultimate breaking point and provide a compressive stress gradient radiating outwardly along substantially the entire depth of the bore and diminishing in an area substantially remote from the bore, which method comprises the steps of: providing a tapered bore through the layers of material; applying an opposing force to the wall of the tapered bore, said opposing force being substantially evenly disposed and substantially simultaneously applied along substantially the entire length of the bore, and said opposing force being sufficient to plastically flow the material radially outwardly from the bore in the said parameter of strain; and relieving the opposing force so as to provide the compressive stress gradient.

References Cited by the Examiner

UNITED STATES PATENTS

| | | |
|---|---|---|
| 322,048 | 7/1885 | Emery. |
| 2,424,087 | 7/1947 | Focke et al. |
| 3,034,611 | 5/1962 | Zenzic _____ 85—1 X |

CHARLIE T. MOON, *Primary Examiner.*